United States Patent
Bagby (10) Patent No.: US 9,217,514 B1
(45) Date of Patent: Dec. 22, 2015

(54) ACTUATOR LOCK-OUT BRACKET

(71) Applicant: Bryce M. Bagby, Longview, TX (US)

(72) Inventor: Bryce M. Bagby, Longview, TX (US)

( * ) Notice: Subject to any disclaimer, the term of this patent is extended or adjusted under 35 U.S.C. 154(b) by 0 days.

(21) Appl. No.: 14/463,322

(22) Filed: Aug. 19, 2014

Related U.S. Application Data (63) Continuation-in-part of application No. 13/622,265, filed on Sep. 18, 2012, now Pat. No. 8,806,906.

(60) Provisional application No. 61/631,202, filed on Dec. 29, 2011.

(51) Int. Cl.
F16K 35/06 (2006.01)

(52) U.S. Cl.
CPC ............. *F16K 35/06* (2013.01); *Y10T 70/5624* (2015.04)

(58) Field of Classification Search
CPC ......... F16K 35/00; F16K 35/06; F16K 35/08; F16K 35/10; G05G 5/28; B60T 17/16; B65D 55/14; B65D 55/145; B67D 7/32; B67D 7/34; Y10T 70/5619; Y10T 70/5624; Y10T 70/5637
USPC ............ 70/175–180, 203, 212, DIG. 30, 174, 70/199, 200, 202, 211; 137/385, 383; 251/95, 101, 111
See application file for complete search history.

(56) References Cited

U.S. PATENT DOCUMENTS

| | | |
|---|---|---|
| 7,598 A | 8/1850 | Finch |
| 391,814 A | 10/1888 | Orme |
| 1,169,906 A | 2/1916 | Anderson |
| 1,171,453 A * | 2/1916 | Miller ........................ 137/384 |
| 1,308,638 A | 7/1919 | Metzger |
| 3,312,794 A | 4/1967 | Hollyday |
| 3,595,040 A | 7/1971 | Curl |
| 3,648,970 A | 3/1972 | Hartmann et al. |
| 3,865,130 A | 2/1975 | Mullis |
| 4,162,690 A | 7/1979 | Anderson |
| 4,498,320 A | 2/1985 | Mullis |
| 4,534,379 A | 8/1985 | Burge |
| 4,971,289 A | 11/1990 | Pietras |
| 5,052,655 A | 10/1991 | Ackroyd |
| 5,058,622 A | 10/1991 | Chitty, Jr. et al. |
| 5,115,834 A | 5/1992 | Champagne |
| 5,139,041 A | 8/1992 | Albrecht |
| 5,215,112 A | 6/1993 | Davison |

(Continued)

FOREIGN PATENT DOCUMENTS

WO WO 2009/137148 * 11/2009

*Primary Examiner* — Lloyd Gall
(74) *Attorney, Agent, or Firm* — Jack D. Stone, Jr., Esq.; Scheef & Stone, L.L.P.

(57) ABSTRACT

A lock-out bracket secures the position of a shaft extending through a pneumatic actuator, the shaft having a first end and a second end, the first end being operative for controlling a valve, the second end being coupled to a limit switch mounted on a limit switch bracket mounted to the actuator. The lock-out bracket includes a substantially flat base plate and a substantially flat lock-out tab substantially perpendicular to the base plate, the base plate defining an opening configured for matingly fitting over, receiving, and engaging the second end of the shaft. The lock-out tab defines a first hole adapted for alignment with a corresponding second hole defined on the limit switch bracket for facilitating the insertion of a lock shackle through the first hole and the second hole to secure the lock-out bracket relative to the actuator and prevent movement of the shaft and valve coupled to the shaft.

4 Claims, 7 Drawing Sheets

(56) References Cited

U.S. PATENT DOCUMENTS

| | | | |
|---|---|---|---|
| 5,244,008 A | 9/1993 | Bauer | |
| 5,261,445 A | 11/1993 | Jones, Jr. | |
| 5,323,805 A | 6/1994 | Scaramucci | |
| 5,365,759 A | 11/1994 | Bonomi | |
| 5,368,066 A | 11/1994 | Scaramucci | |
| 5,372,021 A | 12/1994 | Smith | |
| 5,587,703 A | 12/1996 | Dumont | |
| 5,709,112 A | 1/1998 | Kennedy | |
| 5,799,687 A | 9/1998 | Eckel et al. | |
| 6,041,813 A | 3/2000 | Koch et al. | |
| 6,105,484 A | 8/2000 | Kalthoff et al. | |
| 6,164,318 A | 12/2000 | Dixon | |
| 6,832,623 B2 | 12/2004 | Johnson et al. | |
| 6,880,806 B2 | 4/2005 | Haikawa et al. | |
| 6,959,909 B2 | 11/2005 | Bancroft et al. | |
| 7,044,148 B2 | 5/2006 | Berger et al. | |
| 7,174,756 B2 | 2/2007 | Ling et al. | |
| 7,559,528 B2 | 7/2009 | Gutierrez et al. | |
| 7,900,966 B1 | 3/2011 | Stennett | |
| 8,074,960 B2 | 12/2011 | Milbeck et al. | |
| 8,806,906 B1* | 8/2014 | Bagby | 70/177 |
| 8,893,534 B1* | 11/2014 | Niemi | 70/14 |
| 8,904,834 B2* | 12/2014 | Finkelstein et al. | 70/134 |
| 2001/0000850 A1 | 5/2001 | Nishimura et al. | |
| 2002/0050155 A1 | 5/2002 | Babbitt, III | |
| 2002/0078721 A1 | 6/2002 | Vellette et al. | |
| 2004/0055344 A1 | 3/2004 | Bullock et al. | |
| 2004/0226611 A1 | 11/2004 | Berger et al. | |
| 2007/0090921 A1 | 4/2007 | Fisher | |
| 2008/0022733 A1 | 1/2008 | Abe | |
| 2009/0188144 A1 | 7/2009 | Ludlow et al. | |
| 2010/0108921 A1* | 5/2010 | Milbeck et al. | 251/90 |
| 2010/0319416 A1* | 12/2010 | Eller, Jr. | 70/164 |
| 2012/0126156 A1* | 5/2012 | Bennett | 251/90 |
| 2013/0256571 A1* | 10/2013 | Cancel et al. | 251/90 |

\* cited by examiner

ACTUATOR LOCK-OUT BRACKET

CROSS-REFERENCE TO RELATED APPLICATIONS

This application is a continuation-in-part of U.S. Pat. No. 8,806,906, formerly co-pending patent application Ser. No. 13/622,265, filed on Sep. 18, 2012, and issued on Aug. 19, 2014, and claims the benefit of U.S. Provisional Application No. 61/631,202, filed Dec. 29, 2011, both of which applications are hereby incorporated herein by reference, in their entirety.

TECHNICAL FIELD

The invention relates generally to actuators adapted for controlling valves and, more particularly, to a system and method for locking actuators to prevent movement of a valve controlled by the actuator.

BACKGROUND

Process manufacturing companies, chemical companies, food industries, water treatment facilities, and the like are, on a daily basis, taking the safety of their employees more and more seriously and, accordingly, are continually looking for ways to improve their safety records by minimizing the number of injuries at their work place. Employee safety is further encouraged by the Occupational Safety and Health Administration (OSHA) which requires that companies insure that their employees have a safe working environment, and that companies develop policies and procedures for maintaining operating equipment.

In view of the foregoing, most manufacturing facilities have developed procedures referred to as "lock-out" and "tag-out" procedures for employees to implement whenever a piece of equipment needs to be isolated or brought down for maintenance. In most cases, such procedures require that valves and electric motors be locked, de-energized, or fixed so they are inoperable. Most valves have actuators mounted on them to allow computers and other programmable logic controllers (PLCs) to open and close such valves. There are, however, a number of shortcomings with such procedures. For example, some procedures require devices that are prohibitively expensive, or such devices failed to do what they were supposed to do, or they were simply too difficult and/or time-consuming to install or make work. Such devices, when not being used, also require storage space and some means of tracking the devices.

In other cases, rather than using devices to lock-out valves, the air supply to the respective actuators that control the valves is removed in an attempt to prevent the valves from opening during preventive maintenance or a major shutdown. A drawback with this method is that the valves controlled by actuators are valves, such as butterfly valves, which open or close with a turn of about 90°. When pressure builds up or is exerted against the valve seat of such valves; the valve will tend to open, if only slightly, but even if only slightly, fluid that leaks by such a valve could render a work area, such as the interior of a vessel, hazardous.

Accordingly, a continuing search has been directed to the development of a simpler and more secure way to lock-out and secure an actuator and valve so that the valve cannot leak fluid when closed, and thereby maintain safety for men working and/or repairing equipment.

SUMMARY

The present invention, accordingly, provides a lock-out bracket configured to secure the position of a shaft extending through an actuator, the shaft having a first end operative for controlling a valve, and a second end coupled to a limit switch mounted on a limit switch bracket mounted to the actuator. The lock-out bracket preferably includes a substantially flat base plate and a substantially flat lock-out tab substantially perpendicular to the base plate, the base plate defining an opening configured for matingly fitting over, receiving, and engaging the second end of the shaft. The lock-out tab defines a first hole adapted for alignment with a corresponding second hole defined on the limit switch bracket for facilitating the insertion of a lock shackle through the first hole and the second hole to secure the lock-out bracket relative to the actuator and prevent movement of the shaft and valve coupled to the shaft.

In a method for configuring an actuator to secure a closed position of a shaft extending through the actuator, the limit switch bracket and limit switch are removed from the actuator. A lock-out bracket is mounted onto the second end of the shaft, and the lock-out bracket includes a lock-out tab that defines a first hole. The limit switch bracket and limit switch are then mounted onto the actuator, and the limit switch is coupled to the second end of the shaft. The valve is then closed; and a second hole is formed in the limit switch bracket that aligns with the first hole of the lock-out tab. To secure the valve in a closed position, a shackle of a lock is extended and secured through the first hole and the second hole.

By using the lock-out bracket of the present invention, operations and/or maintenance personnel can secure a valve in a closed position so that, for example, maintenance personnel can work on or in vessels without concern about chemicals leaking into the vessel.

The present invention also allows for normal operation of an actuator without removal of the lock-out bracket. Once the lock-out bracket is installed, it can remain permanently installed for use whenever it is needed without interrupting normal operation of the actuator.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the discussion of the FIGURES, the same reference numerals will be used throughout to refer to the same or similar components. In the interest of conciseness, details concerning various other components known to the art, such as actuators, limit switches, and the like necessary for the operation of valves, have not been shown or discussed in detail inasmuch as such details are not considered necessary to obtain a complete understanding of the present invention, and are considered to be within the skills of persons of ordinary skill in the relevant art. Additionally, as used herein, the term "substantially" is to be construed as a term of approximation.

Figure 1:
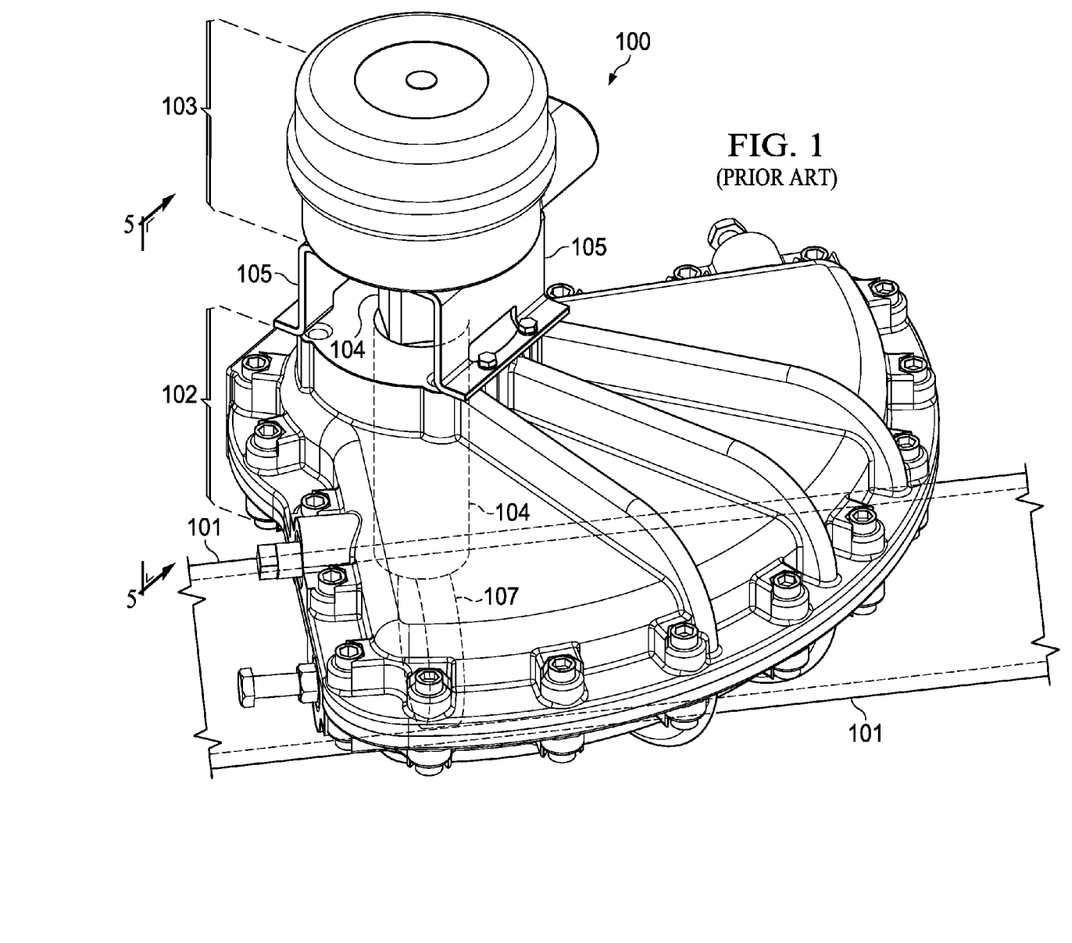
FIG. 1 is a perspective view of a conventional actuator and limit switch mounted on a pipe and coupled to a valve in the pipe.

Referring to FIG. 1 of the drawings, the reference numeral 100 generally designates a system embodying features of the prior art. The system 100 includes an actuator 102 and a limit switch 103 mounted on the actuator via a limit switch bracket 105, all of which are well known in the art. The actuator 102 is preferably a pneumatic actuator, and includes a shaft 104 extending through the actuator upwardly, as shown, and downwardly (not shown). The upward extension of the shaft 104 is preferably coupled to the limit switch 103 via a short rod 122 (FIG. 5), and the downward extension of the shaft 104 is typically coupled to a process system valve 107 operable within a pipe 101. The valve 107 is exemplified as a butterfly valve in a closed position, but could, by way of example but not limitation, be a ball valve or any valve operable for being opened or closed by being rotated through an angle of approximately 90° in one direction or another in a conventional manner well-known in the art. Operation of the actuator 102 is preferably automated via a computer, a programmable logic controller (PLC), or the like (not shown), coupled to the actuator to open and close the valve 107, or to move or change the position of the valve 107.

Figure 2:
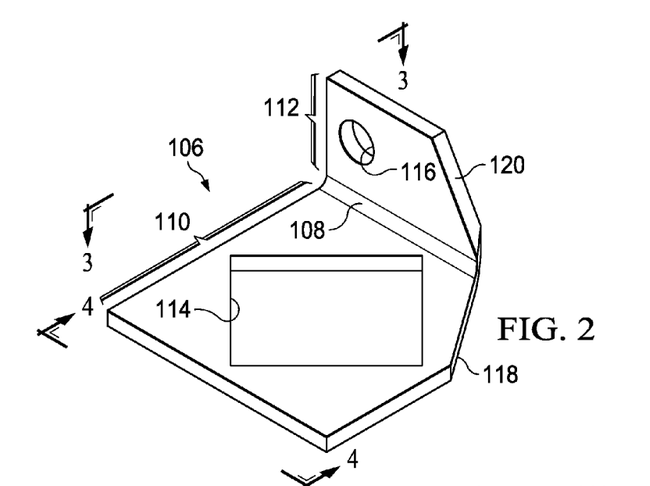
FIG. 2 is a perspective view of a lock-out bracket embodying features of the present invention.
Figure 3:
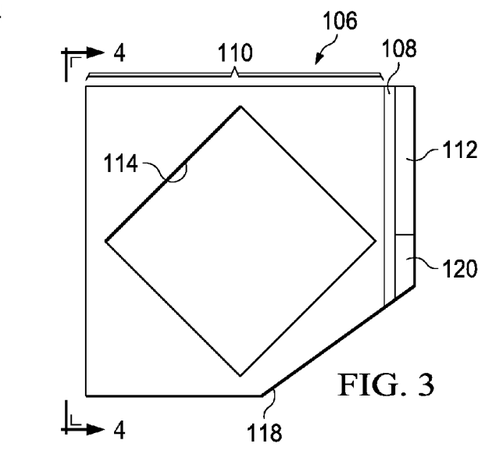
FIG. 3 is a plan view of the lock-out bracket of FIG. 2 taken along the line 3-3 of FIG. 2.
Figure 4:
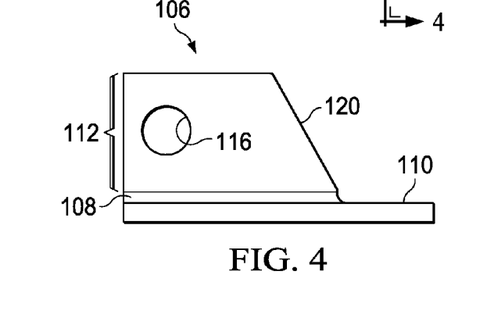
FIG. 4 is an elevation view of the lock-out bracket of FIG. 2 taken along the line 4-4 of FIG. 2.

FIGS. 2-4 exemplify perspective, plan, and elevation views, respectively, of a lock-out bracket 106 embodying features of the present invention. The lock-out bracket 106 preferably comprises a flat base plate 110 that, as viewed in FIGS. 2 and 4, is generally horizontally oriented, and a flat lock-out tab 112 that is preferably perpendicular to the base plate and generally vertically oriented, as viewed in FIGS. 2 and 4. The base plate 110 and the lock-out tab 112 are preferably formed from a single plate bent at a crease 108, but may be formed in alternative manners, such as two pieces of flat plate joined (e.g., welded) at the crease 108. The lock-out bracket 106 is preferably fabricated from a stainless steel, such as 11 or 12 gauge 304 or 316 L stainless steel, though any material suitable for restraining movement of the shaft 104 may be used.

The base plate 110 of the lock-out bracket 106 defines a hole 114 sized (e.g., as a square, depicted) to matingly receive and fit over the shaft 104 (exemplified having a generally square cross-section) so as to securely engage the shaft. The hole 114 is preferably further configured so that the lock-out bracket 106 will be oriented as depicted in FIG. 6 when the valve 107 is closed. The lock-out tab 112 of the lock-out bracket 106 defines a hole 116 sized and positioned to align with a corresponding hole 124 on the limit switch bracket 105, discussed in further detail below with respect to FIGS. 5-8. The lock-out bracket 106 further preferably includes a first chamfer 118 on the base plate 110, and a second chamfer 120 on the lock-out tab 112, the two chamfers preferably being generally contiguous and sized for facilitating rotation of the lock-out bracket 106 within the confines of the limit switch bracket 105.

Figure 5:
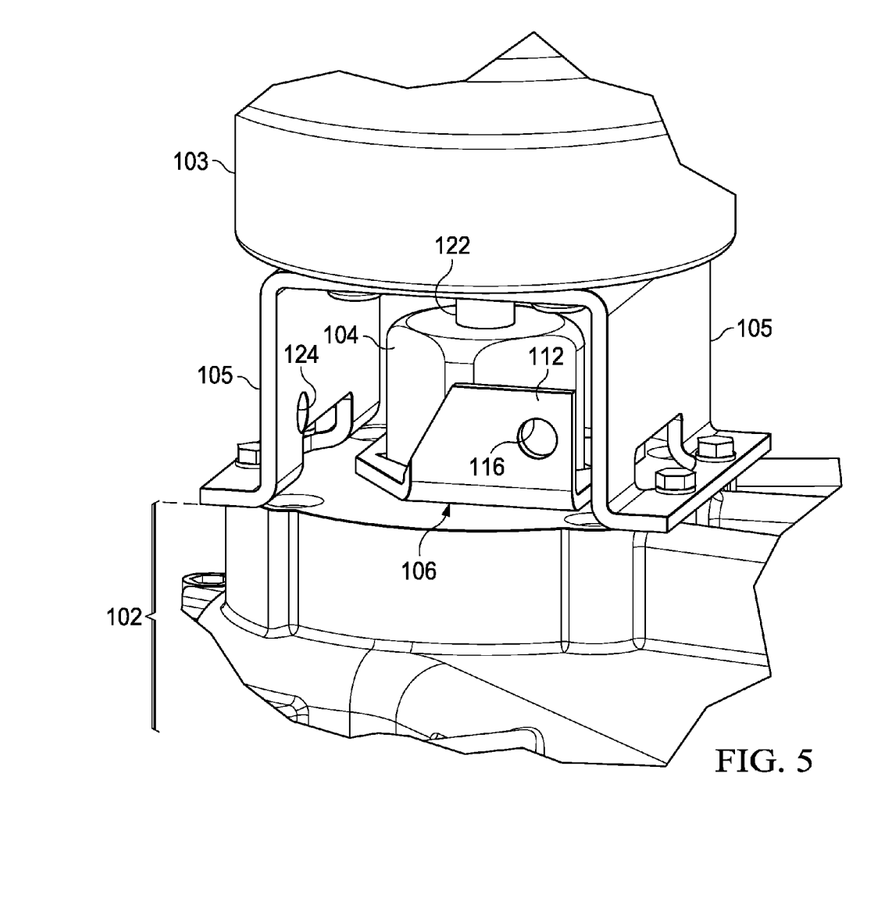
FIG. 5 is a perspective view of a portion of the actuator with the limit switch mounted thereon taken along the line 5-5 of FIG. 1, and including placement of the lock-out bracket of FIGS. 2-4 mounted thereon and for an open valve unsecured in accordance with principles of the present invention.
Figure 6:
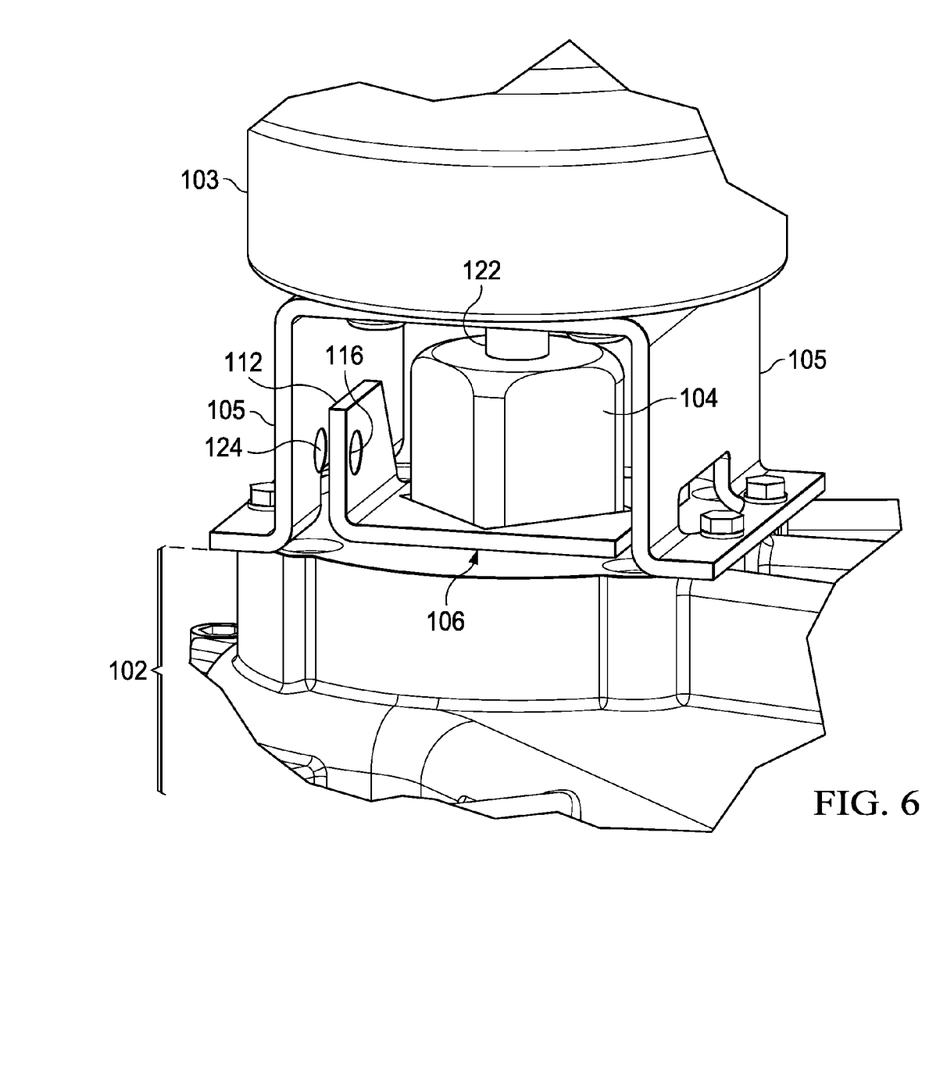
FIG. 6 is a perspective view of the actuator, limit switch, and lock-out bracket of FIG. 5 showing the lock-out bracket of FIGS. 2-4 mounted thereon for a closed valve unsecured in accordance with principles of the present invention.

FIG. 5 depicts the limit switch 103 mounted on the limit switch bracket 105 mounted on the actuator 102 for a valve 107 in an open position. As shown in FIG. 5, movement of the shaft 104, and hence valve 107, is not restrained by the lock-out bracket 106, typical when the valve 107 operated by the actuator 102 is in an open position.

FIG. 6 depicts the shaft 104 rotated through an angle of 90° so that the lock-out bracket 106 is likewise rotated through an angle of 90° until the hole 116 of the lock-out bracket 106 is aligned with a hole 124 defined on the limit switch bracket 105. This position of the bracket and shaft would be typical when the valve 107 operated by the actuator 102 is in a closed position.

Figure 7:
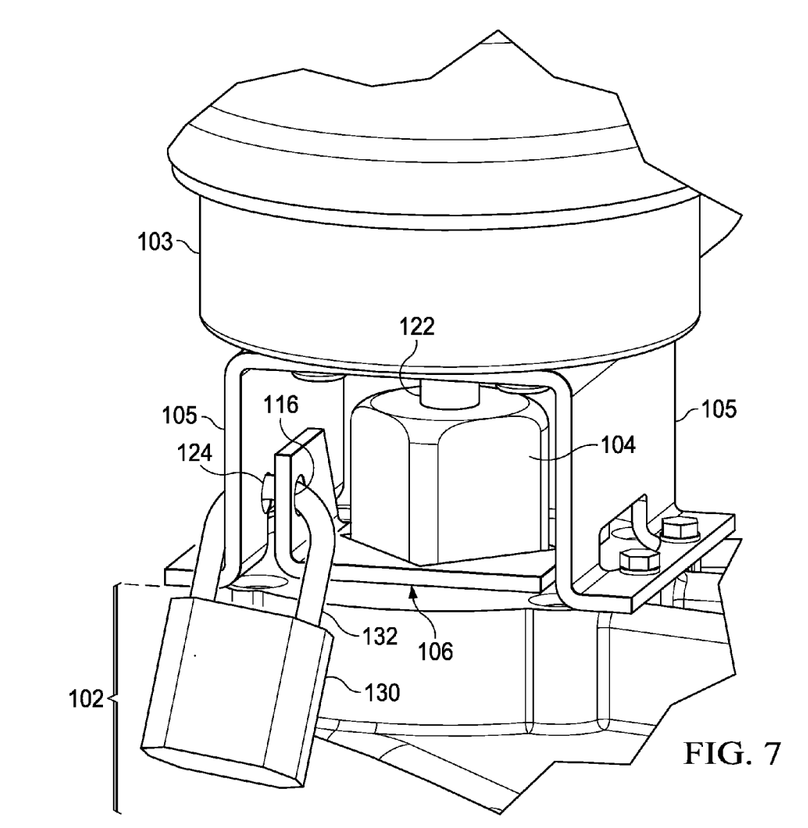
FIG. 7 is a perspective view of the actuator, limit switch, and lock-out bracket of FIG. 6 with the addition of a lock to secure the lock-out bracket and closed valve in accordance with principles of the present invention.

FIG. 7 exemplifies how the lock-out bracket 106 is secured so that it is restrained from movement, and so that the valve 107 operated by the actuator 102 is maintained in a closed position. This is achieved by extending a shackle 132 of a lock 130, such as a key lock or a combination lock, through the aligned holes 116 and 124, thereby securing the alignment of the holes and restraining movement of the lock-out bracket 106, shaft 104, and thus valve 107 coupled to the downward portion of the shaft 104.

Figure 8:
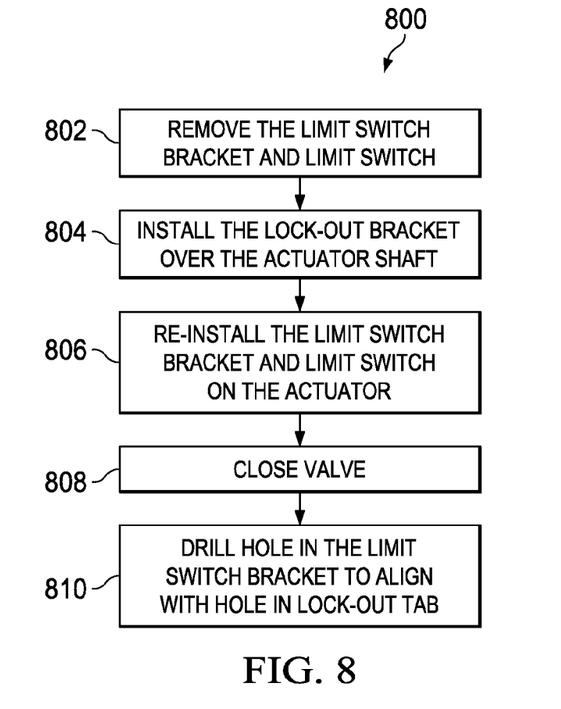
FIG. 8 is a flow chart exemplifying steps for configuring the actuator to secure a valve in a closed position, in accordance with principles of the present invention.

FIG. 8 depicts a flowchart 800 which exemplifies steps of a method for configuring the limit switch bracket 105 and assembling the lock-out bracket 106 onto the actuator 102. Accordingly, in step 802, the limit switch bracket 105, as well as the limit switch 103 secured to the limit switch bracket, are removed from the actuator 102.

In step 804, preferably with the valve 107 in an open position, the hole 114 (FIGS. 2 and 3) of the lock-out bracket 106 is positioned to receive the shaft 104, so that the lock-out bracket is positioned on the shaft 104 as shown in FIG. 5. The shaft 104 is then engaged with the lock-out bracket 106, so that the shaft and lock-out bracket move together with the same degree of freedom or restraint, as the case may be.

In step 806, the limit switch bracket 105 and limit switch 103 are re-installed onto the actuator 102, as shown in FIG. 5. In step 808, the valve 107 is closed, as shown in FIG. 6. In step 810, a hole 124 is drilled in the limit switch bracket 105 that lines up with the hole 116 defined on the lock-out bracket 106. The hole 124 may be formed in the limit switch bracket 105 in any conventional manner, such as by marking the location with a marker extending through the hole 116 to the limit switch bracket 105, and a hole drilled where marked. The diameter of the holes 116 and 124 is preferably sized to allow the shackle 132 of the lock 130 to fit snugly therethrough.

Figure 9:
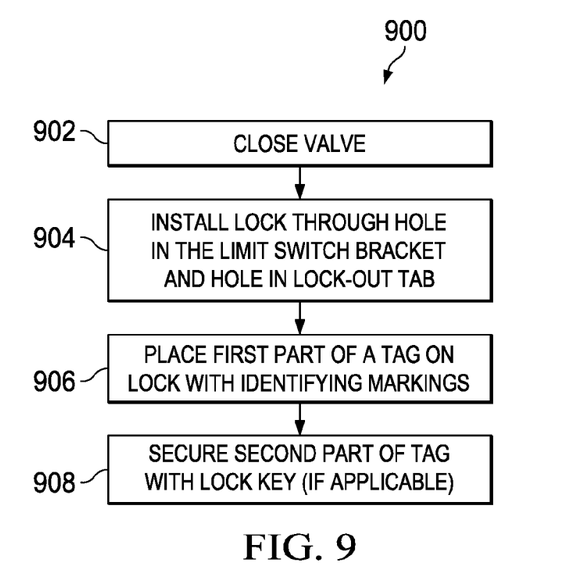
FIG. 9 is a flow chart exemplifying steps for securing a valve coupled to the actuator of FIG. 8 in a closed position.

FIG. 9 depicts a flowchart 900 which exemplifies steps of a method for restraining a closed valve 107 from movement. Accordingly, in step 902, the actuator 102 is used to close the valve. In step 904, with the holes 116 and 124 aligned, the shackle 132 of the lock 130 is passed through the holes 116 and 124 to thereby restrain movement of the lock-out bracket 106, shaft 104, and valve 107.

In step 906, a first part of two parts of a tag (not shown) is preferably secured to or proximate to the lock 130. The first part of such tag preferably includes at least an identifying number and optionally the purpose for which the valve 107 is locked. A second part of each tag preferably includes the same identifying number as on the first part of the tag, as well as further identifying markings such as, by way of example but not limitation, the location of the tag, the valve 107 the lock is placed on, and the purpose for which the valve is locked-out. In step 908, the second half of the tag, as well as the key to the lock (assuming the lock is a key lock) is preferably placed in a security box that is preferably locked, thereby preventing quick and easy access to the lock.

Figure 10:
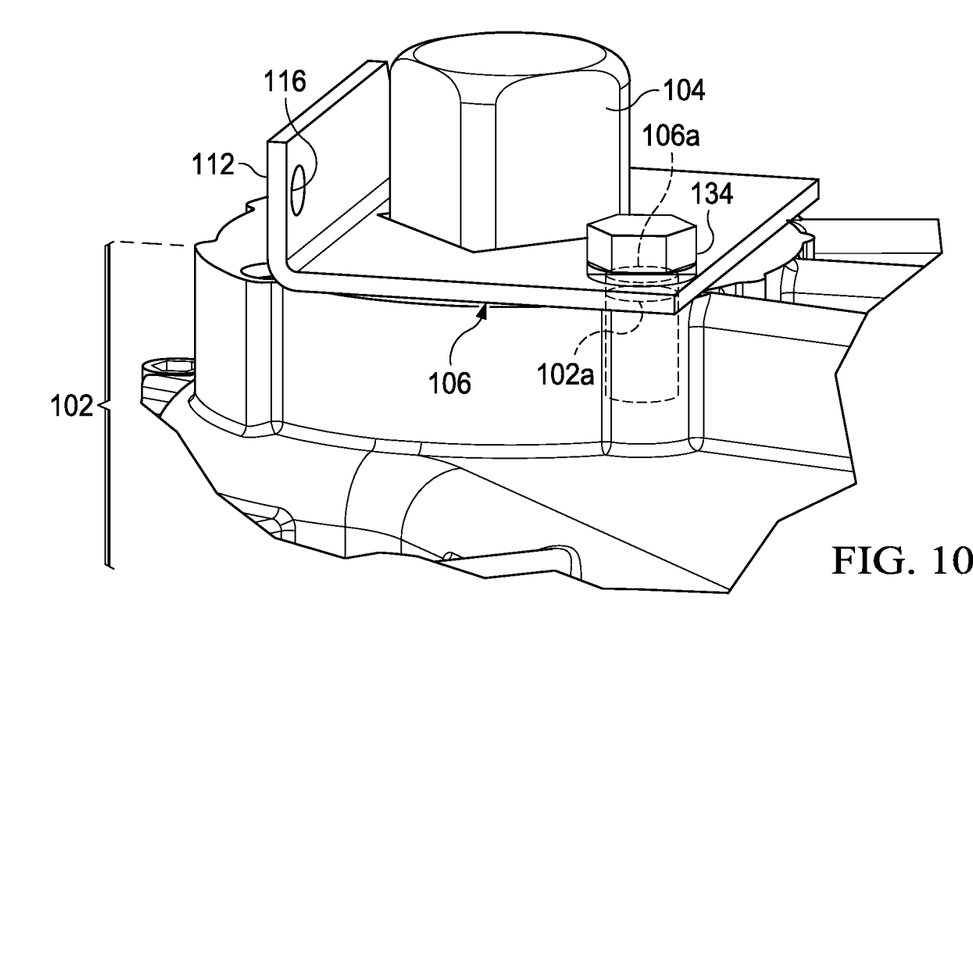
FIG. 10 exemplifies a perspective view of a portion of an alternative embodiment of the invention utilized in connection with an actuator without a limit switch.

FIG. 10 exemplifies an alternative embodiment of the invention that may be utilized in connection with an actuator 102 configured without a limit switch bracket 105 (and hence without a limit switch) to which the lock-out bracket 106 may be secured. According to this embodiment, the lock-out bracket 106 is preferably sized large enough to extend across a bolt hole 102a in the actuator 102. A hole 106a is formed in the lock-out bracket 106 for alignment with the hole 102a when the lock-out bracket 106 is positioned on the shaft 104 with the valve 107 in a closed position. The hole 106a is suitably-sized for snugly receiving a bolt 134 that will threadingly engage the hole 102a. In operation, when the actuator 102 closes the valve 107, the valve is secured in the closed position by passing the bolt 134 through the hole 106a and screwing it into the hole 102a. Optionally, a tag may be attached to the hole 116 as described above.

By the use of the present invention, a valve may be secured in a closed position to thereby promote the safety of persons who may work on equipment in fluid communication with the valve.

It is understood that the present invention may take many forms and embodiments. Accordingly, several variations may be made in the foregoing without departing from the spirit or the scope of the invention. For example, the embodiment of FIG. 10 could be used with a limit switch bracket and limit switch positioned on the actuator of FIG. 1, and/or integrated into the embodiment of FIGS. 2-9.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A system adapted for controlling a valve, the system comprising:
   a valve;
   a pneumatic actuator having a shaft extending through the actuator, the shaft having a first end and a second end, the first end being coupled to the valve for controlling the valve;
   a limit switch bracket fixedly mounted to the actuator;
   a limit switch mounted on the limit switch bracket and coupled to the second end of the shaft of the actuator; and
   a lock-out bracket comprising a substantially flat base plate and a substantially flat lock-out tab extending substantially perpendicularly from the base plate, the base plate defining a square hole through which the second end of the shaft extends from the actuator to, and is coupled to, the limit switch; the lock-out tab defining a first hole for alignment with a corresponding second hole defined on the limit switch bracket adapted for facilitating the insertion of a shackle of a lock through the first hole and the second hole to secure the lock-out bracket relative to the actuator and adapted to prevent movement of the first end of the shaft adapted for controlling the valve.

2. The system of claim 1 wherein the base plate of the lock-out bracket and the lock-out tab of the lock-out bracket are a contiguous plate of metal bent at a crease.

3. The system of claim 1 wherein the base plate of the lock-out bracket and the lock-out tab of the lock-out bracket are welded together.

4. The system of claim 1 wherein at least one corner of the base plate is chamfered and at least one corner of the lock-out tab is chamfered.

* * * * *